May 12, 1936.     A. C. HOUGLAND     2,040,654
GEAR TRANSMISSION FOR CHURNS
Filed May 26, 1934     2 Sheets-Sheet 1
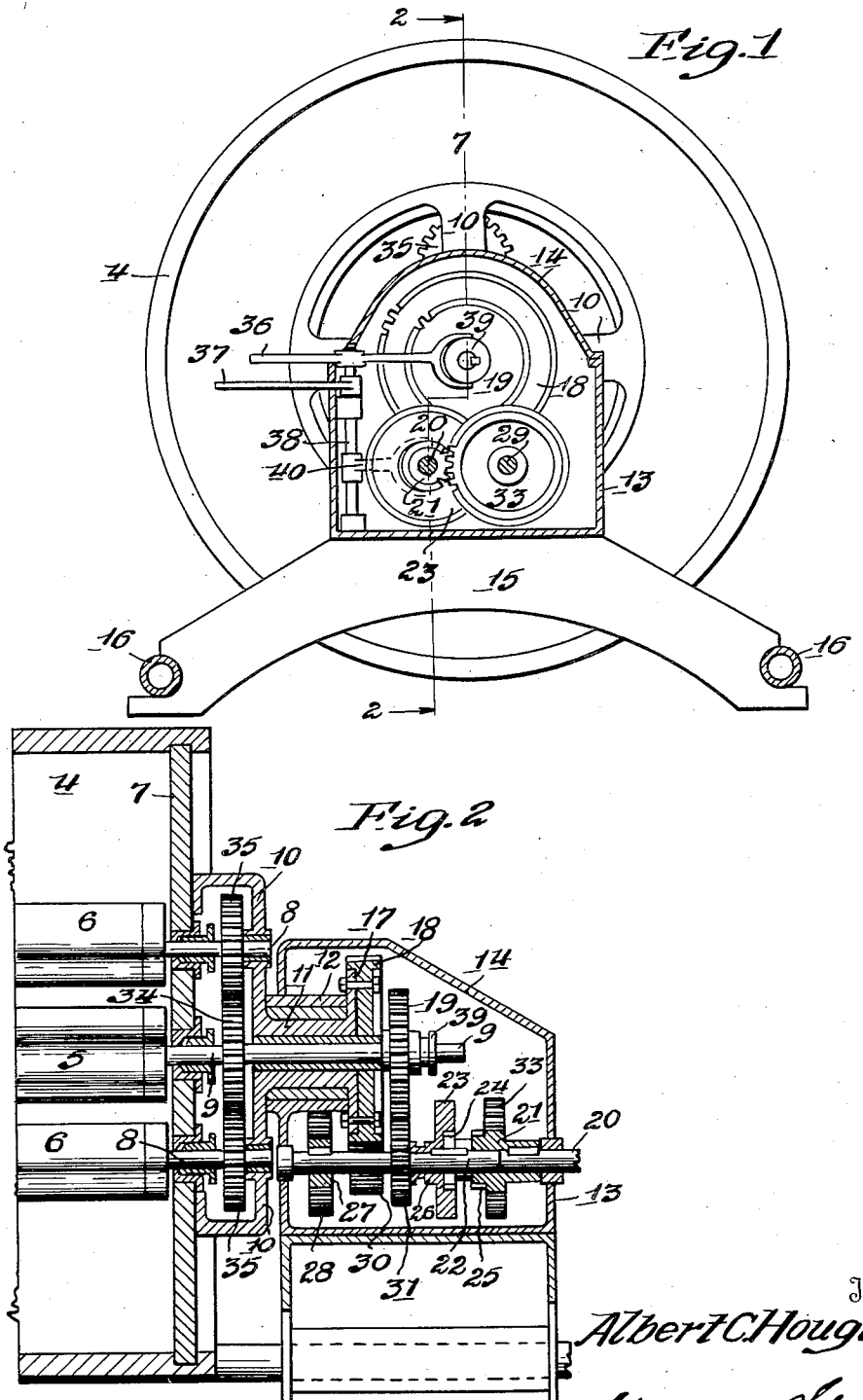
Inventor
Albert C. Hougland
By Stryker & Stryker
Attorneys

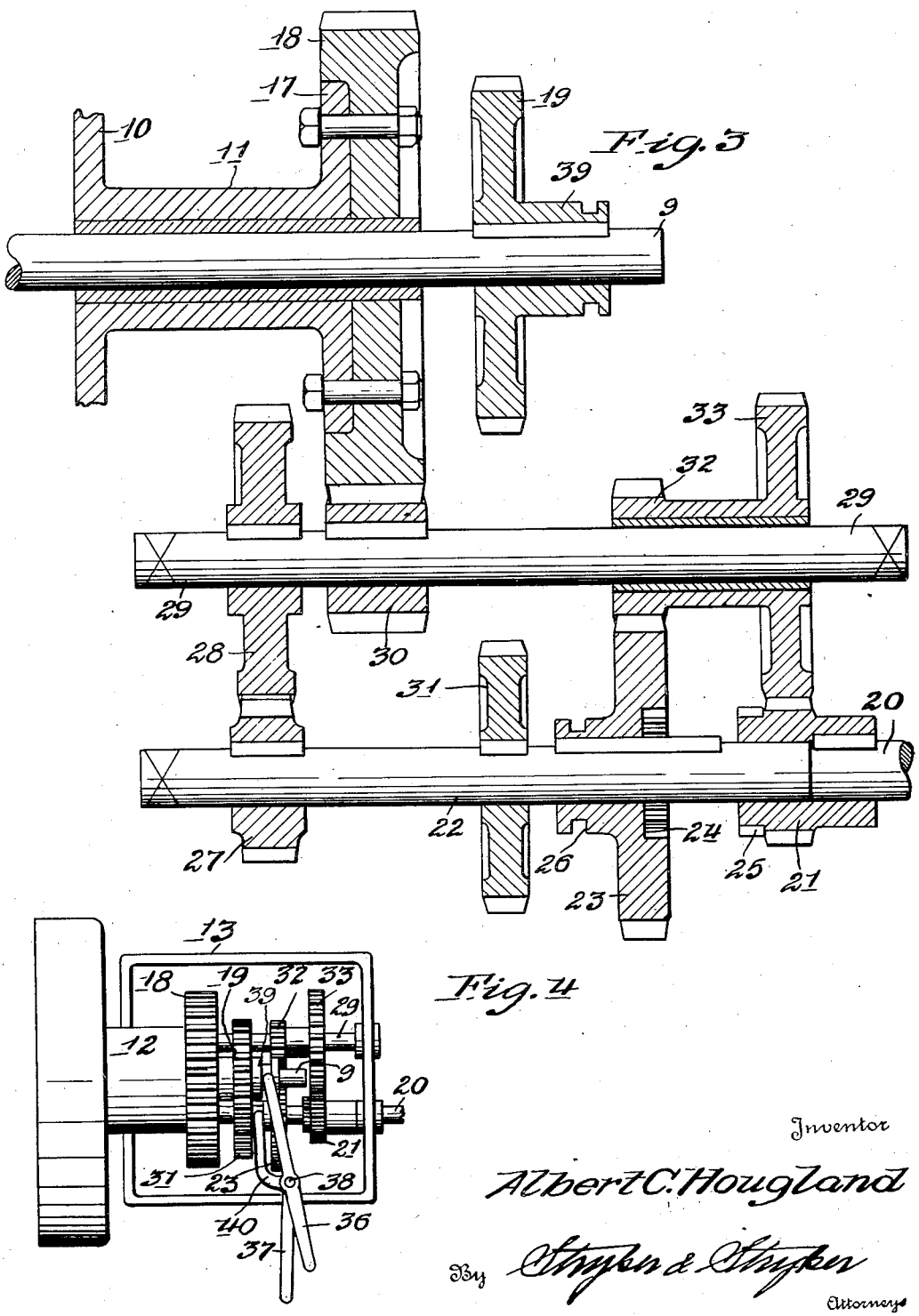

Patented May 12, 1936

2,040,654

UNITED STATES PATENT OFFICE 2,040,654

GEAR TRANSMISSION FOR CHURNS

Albert C. Hougland, St. Paul, Minn.

Application May 26, 1934, Serial No. 727,743

2 Claims. (Cl. 74—389)

It is the object of this invention to simplify and render more efficient change-speed driving mechanism for churns by reducing the number of shafts and gears and arranging them more compactly in a housing or gear case wherein the several bearings and gears operate in a bath of oil.

The invention will be best understood by reference to the accompanying drawings in which, Figure 1 is an end view of my improved driving mechanism showing its relation to a churn and with the gear casing in vertical section;

Fig. 2 is a partial vertical section through the axis of the churn and through the driving mechanism taken approximately on the line 2—2 of Fig. 1;

Fig. 3 is a sectional view of the operating parts removed from the casing and with the shafts transposed about the axis of the churn so as to lie in a common plane, and Fig. 4 is a plan view of the driving mechanism with the gear casing top removed.

In the drawings the numeral 4 indicates the large cylindrical body of a commercial churn disposed with its axis in horizontal position and containing the usual or suitable butter working rolls 5 and 6. The end of the churn indicated by the numeral 7 is formed with suitable bearings for shafts 8 and 9 which project respectively from the rolls 5 and 6 and each bearing is provided with a suitable packing gland around the shaft therein. To revolubly support the churn, a large ring having radial arms 10 is secured to the end 7, the arms being formed with bearings for the outer ends of the shafts 8. Integral with the arms 10 and formed coaxially with the churn is a hub 11. The hub is revoluble in a trunnion 12 supported on a casing 13 having a cap 14 which is removable to allow access to the gearing and shafts therein. A large cradle casting 15 affords a support for the casing 13 and is connected by longitudinal frame members 16 with the frame or standard for supporting the opposite end of the churn (not shown).

An annular flange 17 is formed on the outer end of the hub 11 and bolted to this flange is a large gear 18 for rotating the churn. The shaft 9 extends axially through the hub 11, having a suitable bearing therein, and slidably mounted on the end of this shaft within the casing 13 is a spur gear 19. This gear is keyed to the shaft but free to move longitudinally thereon, as hereinafter described.

Power is transmitted to the churn and rolls by a shaft 20 which projects from the casing 13. Exterior of the casing 13, I prefer to provide the shaft 20 with a clutch and drive pulley, as described in my co-pending application, Serial No. 557,597, filed August 17, 1931, for Driving mechanism for churns. Keyed to the shaft 20 within the casing 13 is a pinion 21 and coaxially disposed relative to the shaft 20 within the casing 13 is a shaft 22 having a bearing at one end within the hub of the pinion 21 and another bearing in the opposite end wall of the casing 13. A gear 23 is slidably mounted on the shaft 22 and has teeth around its outer periphery and also within a recess 24 in its face adjacent to the pinion 21. Teeth 25 are formed on the pinion 21 to engage the teeth in the recess 24. An annular recess 26 is formed in a hub on the gear 23 to be engaged by a lever for shifting the gear as hereinafter described. Also keyed to the shaft 22 is a pinion 27 meshing with a gear 28 fast on a shaft 29 and a gear 31 in mesh with the gear 19. The shaft 29 has suitable bearings in the ends of the gear casing. A pinion 30 is fixed on the shaft 29 for driving the large gear 18 and churn body. It will be evident that the butter working rolls are driven counter to the churn body through the gears 31 and 19 connecting the shaft 22 to the shaft 9. Revolubly mounted on the shaft 29 is a pinion 32 and gear 33, preferably comprising a single, integral casting arranged to mesh with the gear 33 and pinion 21 respectively. The pinion 32 and gear 33 have suitable bearings on the shaft 29 so that they rotate as a unit thereon.

The drive for the butter working rolls 6 includes a gear 34 fixed on the shaft 9 in mesh with gears 35 severally keyed to the shafts 8. To actuate the gears 19 and 23 along the shafts on which they are respectively mounted, I provide manually operable levers 36 and 37. The lever 36 is freely pivoted on the upper end of a vertical shaft 38 having bearings within the gear casing 13. A forked end of the lever 36 engages the gear 19 in an annular groove formed in a hub 39 of said gear. The lever 37 is keyed to the shaft 38 and an arm 40, rigidly secured to said shaft, projects to engage the gear 23 in the groove 26.

Operation

During the churning of the butter the churn body must be rotated at a relatively high speed and it is not desirable that the butter working rolls be driven during this operation. To render the butter working rolls inoperative, the lever 36 is manipulated to slide the gear 19 to the right, as seen in Figs. 2 and 4, out of mesh with the gear 31. To rotate the churn body for churning, the lever 37 is actuated to move the gear 23 to the right, from the position shown in Figs. 2 and 3, into driving engagement with the teeth 25 on the pinion 21. The gear 23, being keyed to the shaft 22, now causes the latter shaft to be driven directly from the power shaft 20 with the result that the churn body is rotated at the higher speed through the pinion 27, gear 28, shaft 29, pinion 30, gear 18 and hub 11. During this operation the gears 32 and 33 merely idle on the shaft 29.

For working the butter, the gear 23 is placed in mesh with the pinion 32 and the gear 19 in mesh with the gear 31. The drive thus established is from the pinion 21 through the gear 33, pinion 32, gear 23, shaft 22, pinion 27, gear 28, shaft 29, pinion 30 and gear 19 to the churn body and from the shaft 22 through gears 31 and 19 to the shaft 9 driving the butter working rolls through the gears 34 and 35. Thus the churn body is rotated at the relatively low speed during the butter working operation.

By locating the shafts 22 and 29 at substantially an equal distance above the bottom of the casing 13 the amount of oil required for the desirable immersion of the gearing is reduced to a minimum. It will now be evident that I provide an unusually compact, simple and efficient arrangement of driving mechanism enclosed in the casing and further improve the construction by avoiding the use of sprocket wheels and chains which have heretofore been common in churn driving mechanisms.

Having described my invention, what I claim as new and desire to protect by Letters Patent is:

1. A gear transmission for a churn having a revoluble body and butter working rolls in said body comprising, a casing, a hub projecting from said body into said casing, a shaft extending axially through said hub, means operatively connecting said butter working rolls to said shaft, a countershaft extending parallel to said first mentioned shaft in said casing, gears mounted on said countershaft and hub for turning said churn body, a third shaft extending in parallel relation to said countershaft in said casing, means operatively connecting said third shaft to said gears on said countershaft, a pinion and gear revoluble independently of said first mentioned gears on said countershaft and connected together for rotation in unison, a gear slidable longitudinally on said third shaft and arranged to mesh with said pinion, a power shaft projecting from said casing in axial alignment with said third shaft, a second pinion fixed on said power shaft and disposed in mesh with said gear on said countershaft, means for directly connecting said power shaft to said third shaft and means in said casing for driving said first shaft counter to said third shaft.

2. A gear transmission for a churn having a revoluble body and butter working rolls in said body comprising, a casing, a hub projecting from said body into said casing, a shaft extending axially through said hub, means operatively connecting said butter working rolls to said shaft, a countershaft extending parallel to said first mentioned shaft in said casing, a gear and pinion on said countershaft and a gear on said hub for rotating said churn body, a third shaft extending in parallel relation to said countershaft in said casing, said third and counter shafts being spaced substantially equally from the bottom of said casing, a gear on said third shaft in mesh with said gear on said countershaft, a second pinion and gear revoluble independently of said first mentioned gear and pinion on said countershaft and connected together for rotation in unison, a gear slidable longitudinally on said third shaft and arranged to mesh with said pinion, a power shaft projecting from said casing in axial alignment with said third shaft, a second pinion fixed on said power shaft and disposed in mesh with said gear on said countershaft, means for directly connecting said power shaft to said third shaft and a pair of spur gears in said casing for driving said first shaft from said third shaft.

ALBERT C. HOUGLAND.